Figure 1:
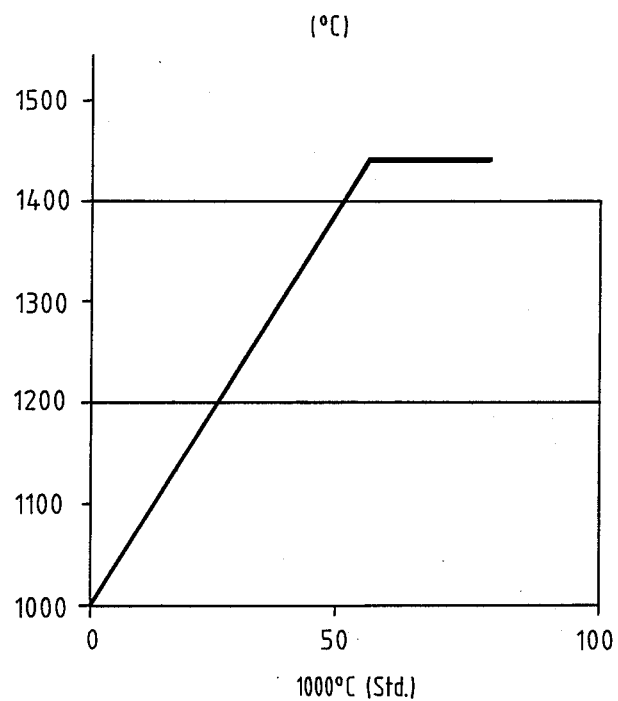

United States Patent [19]

Koschlig et al.

[11] Patent Number: 4,866,015
[45] Date of Patent: Sep. 12, 1989

[54] SILICA BRICK AND PROCESS FOR PRODUCING SAME

[75] Inventors: Hans-Joachim Koschlig, Bochum; Engelbert Overkott, Gevelsberg, both of Fed. Rep. of Germany

[73] Assignee: Dr. C. Otto Feuerfest GmbH, Fed. Rep. of Germany

[21] Appl. No.: 155,214

[22] Filed: Feb. 12, 1988

[30] Foreign Application Priority Data

Feb. 17, 1987 [DE]  Fed. Rep. of Germany ....... 3705002

[51] Int. Cl.[4] .............................................. C04B 35/14
[52] U.S. Cl. ...................................... 501/123; 501/88; 501/133; 501/154
[58] Field of Search ................... 501/88, 133, 154, 123

[56] References Cited

U.S. PATENT DOCUMENTS

| | | | |
|---|---|---|---|
| 439,796 | 11/1890 | Bottome | 501/154 |
| 982,252 | 7/1907 | Collins | 501/133 |
| 1,791,591 | 2/1927 | Caven | 501/133 |
| 1,969,750 | 8/1934 | Heuer | 501/133 |
| 2,446,975 | 8/1948 | Conley | 501/133 |
| 3,620,783 | 11/1971 | Mohler et al. | 501/133 |
| 4,183,761 | 1/1980 | Hoshino et al. | 501/88 |
| 4,631,158 | 12/1986 | Rieck et al. | 501/154 |

OTHER PUBLICATIONS

Hawley, *Condensed Chemical Dictionary*, Van Nostrand Reinhold, N.Y., 1974, p. 783.
Grant, *Haukh's Chemical Dictionary*, McGraw-Hill Book Company, NY, 1980, p. 610.

*Primary Examiner*—William R. Dixon, Jr.
*Assistant Examiner*—David M. Brunsman
*Attorney, Agent, or Firm*—Jones, Askew & Lunsford

[57] ABSTRACT

Silica brick with a quartz grain structure that can be detected in the matrix and is converted to cristobalite and/or tridymite, where the quartz grain structures are surrounded by a thin layer of tridymite formed from a silica gel and/or silica sol and consisting of fine tridymite crystals matted together.

21 Claims, 1 Drawing Sheet

SILICA BRICK AND PROCESS FOR PRODUCING SAME

This invention concerns a silica brick as well as a process for producing same.

Silica bricks are used especially in coke ovens. In the production of coke, a coal mixture lying in a coking chamber of a coke oven is converted to coke by a thermal process. Heat is supplied from a heating chamber indirectly from the outside through the walls of the coking chamber made of silica bricks.

In coking technology, this is a cyclic process that takes about 20 hours. Every 20 hours, a coking chamber is emptied of hot coke and immediately thereafter charged with a cold coal mixture again. In doing so, the walls of the coking chamber cool off greatly within a short period of time and then the walls are very rapidly brought back to high temperatures. Because of these stresses on the walls of the coking oven chamber, two main properties are required of the structural material of the walls:

high resistance to thermal shock in a relatively high temperature range (spalling resistance), high thermal conductivity for the most rapid possible transmission of heat with minimal losses from the heating chamber into the coking chamber.

Spalling resistance is achieved by a low coefficient of expansion in the respective temperature range.

For silica bricks for coke oven chamber walls that are fired as ceramics, mainly with mixtures containing quartz with 2 to 3 wt% lime, whereupon the quartz is converted to the high temperature phases of silicic acid, namely tridymite and cristobalite, an effort is made to achieve the highest possible conversion to tridymite because this phase assures the best spalling resistance. However, the conversion to tridymite requires a very careful, accurate and slow firing process, because otherwise a more rapid conversion takes place to the less desirable cristobalite phase. The success achieved so far through the grain composition of the raw materials, the selection of raw materials and the firing process has been exhausted and cannot be improved further. Thus it is then impossible so far under economically justifiable conditions to achieve an optimum rate of conversion of quartz to tridymite.

German Pat. (OLS) No. 2,220,474 describes a process for production of refractory bricks with a high tridymite content forming a good plastic composition of silicon dioxide material, where a batch of a silicon dioxide material, water and lime hydrate is used. The silicon dioxide material is obtained from the off-gases from smelting furnaces for production of metallic silicon or alloys that contain silicon. First the calcium compounds are precipitated from the batch with an ammonium salt and then a special firing program is followed to assure that the silicon dioxide material is converted to tridymite. The silicon dioxide material used according to the known process is not suitable for production of silica bricks for coke oven chamber walls, because the products produced from it are too porous and thus would have too low a thermal conductivity. They would also have too little strength. Even partial use in mixture with conventional silica batches would not lead to an improvement in quality of silica bricks, because the powdery silicon dioxide material would be converted to cristobalite with the usual firing program required to fire the silica bricks. A change in the firing program tailored to the powdery silicon dioxide material would, however, lead to inadequate conversion of the quartz content of the raw mass.

The thermal conductivity of silica bricks depends directly on the material composition and on the density (porosity).

With regard to the material composition, tridymite yields a better thermal conductivity than cristobalite, so an attempt should be made in this regard to produce the highest possible tridymite content. The tridymite content increases in the course of the temperature stresses once the bricks are installed in the wall, drawing on the residual quartz content and/or the cristobalite content of the fired silica bricks. However, this tridymite conversion is associated with phase shifts that can have a negative effect on strength (embrittlement). Therefore, the goal is to induce the most complete possible conversion of the quartz to tridymite, but as mentioned above, this cannot be achieved with an economically justifiable firing time.

With regard to the material composition to improve the thermal conductivity of silica brick, there has also been an proposal to add a material with a high thermal conductivity, e.g., silicon carbide, to the batch. However, silicon carbide is oxidized by contact with the furnace atmosphere. It then expands and makes the briks brittle (German Pat. No. 2,836,691, column 2, lines 19 to 44).

It is known from German Pat. (OLS) No. 2,217,271 that silicon carbide bricks can be used for the walls of coking chambers when these bricks are fired from a batch consisting essentially of silicon carbide granules and a mullitic binder in such a way that the mullitic binder forms a glass phase coating on each silicon carbide grain that should prevent the penetration of oxidizing agents into the silicon carbide grain. Furthermore, these bricks are provided with a protective coating that is fired on during operation of the coke oven and should seal the pores. However, this teaching cannot be applied to silica bricks that contain granular silicon carbide to improve the thermal conductivity, because the glass phase would have a negative effect on spalling resistance in silica bricks and furthermore would lead to a reduction in strength and refractory stability. Mullitic binders also prevent the quartz-cristobalite-tridymite conversion to such a great extent that no usable silica bricks could be produced.

In this regard it is also known from German Pat. (OLS) No. 3,235,841 that a silicon carbide sintered compact can be protected against oxidation by filling the pores of the compact with a slurry of fine silicon carbide particles. Before using the compact or during operation, first silicon dioxide particles should be formed from the silicon carbide particles in the outer layer of the dried slurry, and these silicon dioxide particles take up more space and block the pores and thus should prevent the diffusion of oxygen into the brick. However, this protection is ineffective when the silicon carbide particles are consumed. Furthermore, this principle cannot be applied to silica bricks that have silicon carbide particles in the structure, because silica bricks must endure for very long periods of time in coke ovens and it is impossible to assure that a sufficient amount of fine-grained silicon carbide is available. Furthermore, cristobalite and tridymite would be formed in an uncontrolled manner from the silicon dioxide formed from the silicon carbide particles. The resultant phase shifts would embrittle the brick.

With regard to the density of the silica bricks, it is fundamentally known that density changes occur in the conversion of quartz to the silicic acid phases tridymite and cristobalite, leading to an increase in the size of the molded blanks during the firing process. As a result, the outside dimensions of silica bricks change during their production process. This is associated with an increase in pore volume and also correlates with a reduction in final density. Due to these particulars in the manufacturing process, there are limits with regard to the minimum porosity and density that can be achieved. According to the state of the art, the limit for the apparent porosity is about 18% and for the apparent density is about 1.92 g/cm$^3$.

To increase the density and thus also increase the thermal conductivity of silica bricks, it is known from German Pat. No. 2,836,691 that 0.5 to 10 wt% silicon nitride and/or silicon carbide should be added to the batch and a very specific firing program maintained and also a specific furnace atmosphere made available. During firing, the silicon nitride and silicon carbide should be converted completely to silicon dioxide which should fill out the pores due to the grain growth so this would result in a higher density and a lower porosity. However, the temperature program is extremely complicated, and furthermore the firing time is a great deal longer than in a conventional firing, so the firing process is uneconomical. Furthermore, inadequate conversion of the silicon dioxide formed from the silicon nitride and the silicon carbide to tridymite is achieved, so this conversion takes place to a substantial extent during operation of the coke oven with the above-mentioned disadvantage of the possible embrittlement of the bricks in the wall. Furthermore, the reduction in porosity is obtained at the cost of an increase in brittleness or reduction in elasticity of the matrix material of the fired brick which in turn results in an unfavorable spalling resistance.

The goal of this invention is to create silica bricks from conventional batches with conventional mixing and compression processes and with the conventional drying and firing conditions with at least equally long firing times, preferably shorter firing times, in such a way that these bricks will have a higher tridymite content than traditional silica bricks and will also have a better thermal conductivity while still achieving a comparable porosity and elasticity in combination with a strength that is nevertheless higher.

This invention proposes the use of silica sol and/or silica gel.

Silica sols are aqueous solutions of colloidal amorphous $SiO_2$ that are commercially available usually in a concentration of 15% to a maximum of 60%. They are used mainly as binders, e.g., in slips for lost wax casting and in binding ceramic fibers for modification of surfaces, e.g., in textile finishing and paper treatment, and in colloidal chemical reactions, e.g., in beverage clarification, gypsum liquefaction and semiconductor polishing.

The binder effect is based on the conversion of the silica sol to silica gel. The silicic acid structure thus formed has a binding effect, e.g., in binding refractory ceramic materials. In binding refractory materials, it is essential that drying yields an almost alkali-free amorphous silicon dioxide whose melting point is about 1480° C. and which has low thermal expansion as well as no shifts in modification. This results in stability at high temperatures and good spalling resistance. When using silica sols as binders, they are used either directly in first liquid aqueous preparations or as impregnating agents for shaped solid porous materials.

Silica sols thus have properties that are undesirable in silica bricks. At first an amorphous porous or very lightweight product cannot make any mentionable contribution toward increasing the thermal conductivity. On exposure to high temperatures, the amorphous composition forms a melt at about 1480° C. without any changes in modification. Such reaction properties of silicic acid have a negative effect in silica bricks especially with regard to thermal conductivity and the spalling resistance that is required of such bricks, although the gel formed from the sol should itself have a low thermal expansion and good spalling resistance.

In addition to silica sols, silica gels are on the market. Silica gels are also molded or unmolded silicic acid products of an elastic to solid consistency with a loose to dense pore structure. The silicic acid in the silica gels is in the form of highly concentrated polysilicic acids with a lamellar structure with a very large surface. Silica gels are mostly produced from water glass by reaction with mineral acids. With the silicic acid hydrosol thus formed and sometimes used industrially as silica sols, the sheathing of the colloidal disperse silicic acid particles with water may be of such an extent at an appropriate temperature and pH that the incoherent system solidifies to a gel in which the disperse silicic acids are arranged in a network or a honeycomb structure in the water. Depending on the degree of drying, this yields silica gels with solids contents up to 95%. The silica gels have surfaces in the range of about 800 m$^2$/g. On exposure to heat, they behave like silica sols and therefore appear to be inherently unsuitable for use in production of silica bricks.

On the basis of the known properties of silica sols and silica gels described above, it is understandable that these products have been disregarded in the production of silica bricks. An impairment in the properties of the silica bricks that have been achieved so far would have to be expected. It was therefore completely surprising that silica sols and silica gels in mixture with conventional silica brick batch components will form modifications of silicic acid in firing. It has been found that tridymite crystals almost completely matted together are formed in a dense packing from silica sols or silica gels, leading to a substantial increase in strength and also an increase in thermal conductivity at the same density in comparison with conventional silica bricks. Furthermore, the spalling resistance is increased. The expected glass phase is not formed, however. The tridymite content of the silica bricks is higher than in comparable silica bricks without silica sol or silica gel. It is not yet known why the formation of tridymite results from the silica sol or silica gel. It is assumed that a catalytically influenced reaction takes place because the increased formation of tridymite is not achieved by an especially long or special firing process, as is the case in the process according to German Pat. No. 2,836,691, but instead with a normal conventional firing program, and this was also surprising. The ovens used in the past can still be used with no change and operated with no change. The firing time and firing temperature can actually be reduced if silica bricks of the same quality in comparison with traditional silica bricks are to be produced.

Since the silica bricks according to this invention are produced with a normal firing process, the other raw materials of the composition are converted as usual so the usual tridymite content and the usual density are achieved. Furthermore, an additional tridymite content is obtained from the silica sol and/or silica gel constituents that also contributes to a higher density because of the high degree of matting of the crystals. The two features—namely the higher tridymite content and the higher density—result in an increase in spalling resistance and thermal conductivity.

When this new principle is compared with the principle according to German Pat. No. 2,836,691, the substantial and surprising technological advance can be seen. According to German Pat. No. 2,836,691, a raw material that supplies $SiO_2$ by oxidation at high temperatures is added in order to achieve the desired density. A special firing program and firing atmosphere with an extremely long firing time must be assured in order to induce the oxidation reaction. In doing so, a denser structure can be formed so the thermal conductivity is increased, but the structure also becomes more brittle, because glass phases may already be formed in the long firing time and the spalling resistance is not improved. Instead the latter tends to become worse because of the high brittleness. A better spalling resistance could be achieved only by increasing the tridymite content. However, the additives used in the known process are converted not to tridymite but instead to amorphous cristobalite so the matrix pores are filled with this phase (German Pat. No. 2,836,691, column 12, lines 37 to 42). According to the teaching of this patent specification, it was thus to be expected that adding a substance that supplies $SiO_2$ would increase the density and thus the thermal conductivity and would lead to the formation of cristobalite in the pores, but that these improvements could be achieved only with a special firing program.

According to one version of this invention, silica sol is added to the batch of raw materials generally used. The water content of the batch preferably remains the same by taking into account the water content of the silica sol and adding a smaller amount of water to the raw mixture accordingly. Processing of the batch of raw materials to molded blanks for silica bricks remains unchanged. Likewise, the drying times and drying temperatures remain unchanged.

Instead of or in combination with the silica sol, silica gel may also be added in highly viscous form or in powder form. Anionic silica sols are preferred, e.g., Bayer silica sols with the designation 200/30% with a solids content of 30 wt%, a pH of 9.0, a density of 1.20 g/cm$^3$, a viscosity of 3 to 4 mPas, a specific surface of 200 m$^2$/g, a particle size of 15 to 20 nm, or it is possible to use Bayer silica sols with the designation 300/40% with a solids content of 40 wt%, a pH of 10.0, a density of 1.29 g/cm$^3$, a viscosity of 7 to 10 mPas, a specific surface of 300 m$^2$/g and a particle size of 15 to 20 nm.

According to another version of this invention, traditional fired silica bricks are impregnated with a silica sol in such a way that the silica sol penetrates into the pores of the brick. Preferably the impregnation is carried out at an excess pressure but especially under a reduced pressure. The impregnated bricks are dried, e.g., at 60° to 140° C. for 6 to 24 hours and then fired again at temperatures of 1050° to 1450° C. for 6 to 60 hours, for example. It has been found surprisingly that the bricks do not undergo any substantial change in volume in their outside dimensions and again in this case tridymite is formed almost completely from the silica sol and grows in the pore space, forming a densely matted finely crystalline bond reinforcing structure there. The density increases by values between 0.05 and 0.1 g/cm$^3$, for example, and thus also the thermal conductivity increases by, for example, 5 to 10%. The spalling resistance is also improved. The above-mentioned Bayer silica sol 200/30% and also the Bayer silica sol 300/30% with a solids content of 30%, a pH of 9.8, a density of 1.21 g/cm$^3$, a viscosity of 3 to 6 mPas, a specific surface of 300 m$^2$/g and a particle size of 7 to 8 nm are especially suitable for impregnation.

The second firing of the silica bricks can also be performed to advantage in the coke oven after installation of the bricks in the wall of the coking chamber where the conversion of the silica sol/gel to the crystalline modification of $SiO_2$, mainly tridymite, takes place later during the startup program intended for operation of the entire oven structure. In this way intergranular pore spaces are sealed. This results in additional binder bridges that reinforce the structure without causing the bricks to undergo a substantial change in volume according to the outside dimensions. In this case the impregnated and then dried silica brick, i.e., freed of excess water, is treated.

The use of silica sol and/or silica gel leads to another surprising effect. When a substance that increases thermal conductivity but has a tendency to oxidation, e.g., silicon carbide granules with grain sizes between 0.1 and 1.0 mm, preferably between 0.2 and 0.6 mm, is added to the batch of raw materials, the silica sol and/or silica gel provides a protective layer on the silicon carbide grains, especially of matted tridymite crystals in a very dense arrangement. This protective layer is no longer permeated by the oxidizing gases so the bricks are just as stable as bricks without silicon carbide constituents. However, the bricks containing silicon carbide are known to have a much better thermal conductivity.

The surprising protective layer effect can also be achieved by subsequent impregnation and a second firing, e.g., in situ, i.e., in the coke oven. The explanation for why a protective layer produced from silica sol and/or silica gel is so effective and permanent has not yet been found.

Preferably, silicon carbide is added to the batch of raw materials in the stated particle size range in amounts of 5 to 25 wt%, preferably 10 to 20 wt%. With a normal silica tunnel oven firing between 1350° and 1450° C., the silicon carbide particles become coated with a stable protective layer which does not permit oxidation of the SiC during exposure to an oxidizing atmosphere at 1400° to 1440° C. for more than a year. The thermal conductivity of such a product is improved by 15 to 50% by these additives.

It is advantageous to use silicon carbide granules that have the following screen analysis:

| | |
|---|---|
| 0.5–1.0 mm | <5 |
| 0.25–0.5 mm | 42–60% |
| 0.1–0.25 mm | 30–45% |
| <0.1 mm | <10% |

This invention will be explained below on the basis of a comparative example. The thermal conductivity of the silica bricks produced according to this invention is compared with that of conventional silica bricks. The silica bricks used for comparison purposes were produced under the manufacturing conditions customary in the past and consistent with the state of the art for silica bricks. The batch for the products according to this invention did not undergo any further changes except for the new additives to the batch. The grain sizes customary in the past were used for the batch of raw materials. Shaping was done according to the production conditions for silica bricks with a conventional density of 1.84 to 1.85 g/cm³. The die molding process was also retained.

The following batches were prepared and molded blanks of silica bricks were shaped from them. The molded blanks were fired to silica bricks under conventional conditions. The firing conditions are given in the accompanying FIG. 1.

FORMULATIONS

1. Silica KD

| | | |
|---|---|---|
| Quartzite 1 | 0–4 mm | 50% |
| Quartzite 2 | 0–4 mm | 35% |
| Ground quartzite | <1 mm | 15% |
| Lime hydrate | | 3.5% |
| Binder, organic | | 0.5% |

2. Silica KD with silica gel

| | | |
|---|---|---|
| Quartzite 1 | 0–4 mm | 50% |
| Quartzite 2 | 0–4 mm | 35% |
| Ground quartzite | <1 mm | 15% |
| Calcium carbonate | | 4.5% |
| Silica gel | | 6.5% |

Impregnated with silica sol in vacuo after firing. Weight increase due to sol: 3–5 wt% of the brick.

3. Silica KD with 15% SiC additive

| | | |
|---|---|---|
| Quartzite 1 | 0–4 mm | 50% |
| Quartzite 2 | 0–4 mm | 35% |
| SiC, ground | <1 mm | 15% |
| Lime hydrate | | 3.5% |
| Binder, organic | | 0.5% |

Impregnated with silica sol in vacuo after firing. Weight increase due to sol: 3–4 wt% of the brick.

4. Silica KD wit 15% SiC additive plus silica gel

| | | |
|---|---|---|
| Quartzite 1 | 0–4 mm | 50% |
| Quartzite 2 | 0–4 mm | 35% |
| SiC, ground | <1 mm | 15% |
| Calcium carbonate | | 4.5% |
| Silica gel | | 6.5% |

Impregnated with silica sol in vacuo after firing. Weight increase due to sol: 3–5 wt% of the brick.

The results of this comparison are given in the following table.

TABLE

Thermal conductivity and physical data on the silica bricks

| Sort | Apparent porosity $P_s$ (%) | Apparent density D (g/cm³) | Thermal conductivity (W/m·K.) | | |
|---|---|---|---|---|---|
| | | | at 400° C. | at 800° C. | at 1200° C. |
| 1. Silica KD | 20.5 | 1.84 | 1.56 | 1.80 | 2.22 |
| 2. Silica KD with 6.5% silica gel (impregnated) | 18.0 | 1.90 | 1.65 | 1.87 | 2.32 |
| 3. Silica + 15% SiC (impregnated) | 19.5 | 1.93 | 1.76 | 2.02 | 2.62 |
| 4. Silica + 15% SiC + 6.5% silica gel (impregnated) | 18.0 | 1.99 | 1.82 | 2.10 | 2.74 |

It follows from this comparative example that the process according to this invention provides for the addition of silica sol and/or silica gel to the raw batch as well as the impregnation of silica bricks produced either with or without the addition of silica sol and/or silica gel to the raw batch. An added amount of silica sol and/or silica gel to the batch of raw materials in the amount of 1.0 to 3.0 wt% $SiO_2$ calculated from the $SiO_2$ content of the silica sol and/or silica gel is preferred. In impregnation, the conditions are preferably such that the silica brick will take up 2.5 to 10 wt% silica sol.

Figure 2:
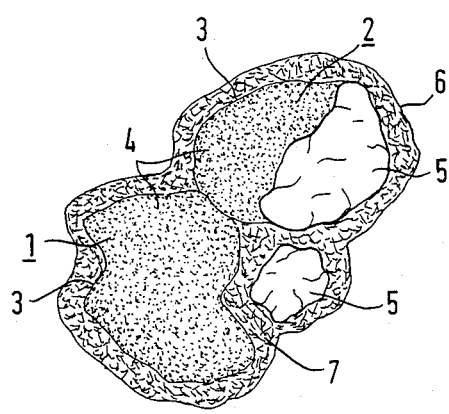
Figure 3:
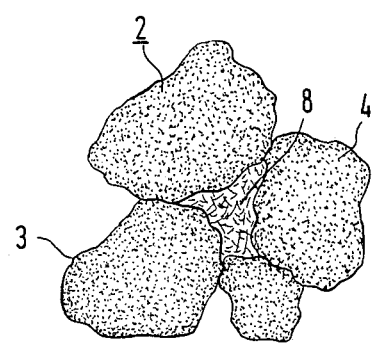

FIGS. 2 and 3 show in diagram form the matrix of a silica brick according to this invention. This is a very simplified presentation of a top view of a thin section.

It can be seen from FIG. 2 that two quartz grain structures 1 and 2 can still be discerned faintly in outlines 3. The quartz grain has been converted to fine small crystals of cristobalite and tridymite 4. In addition to the quartz grain structure 2, there is a silicon carbide grain 5. A layer 6 of matted tridymite crystals 7 has formed around the quartz grain structures 1 and 2 and also around the silicon carbide grain 5. The tridymite crystals 7 are better, longer and more columnar than the cristobalite and tridymite crystals 4 formed from the quartz and have also crystallized fully in a matted form. Layer 6 has a higher degree of crystallization than the zones of the previous quartz grains. The crystallization in layer 6 has the appearance of collective crystallization and thus forms its own easily discernible matrix component.

FIG. 3 shows the matrix of a traditional silica brick with quartz grain structures in which only the wedges 8 have the matted tridymite component formed from silica sol and/or silica gel.

The other variations of the silica bricks according to this invention are not shown separately. However, the matrix corresponds to the components illustrated in FIGS. 2 and 3 so the three-dimensional form of the silica bricks can be recognized by the collective crystallization arrangement of the tridymite crystals formed from the silica sol and/or silica gel. The three-dimensional form is also characterized by the better degree of crystallization and the more elongated and longer tridymite crystals in comparison with the crystals in the quartz grain structure.

It can readily be seen from the comparative example that this invention creates an improvement with relatively simple means and that this result is unusual and could not have been foreseen in any way.

We claim:

1. Silica brick with quartz grain structures that are present in the matrix and have been converted to cristobalite and/or tridymite, characterized by the fact that the quartz grain structures are surrounded by a thin layer of tridymite formed by silica gel silica sol and consisting of fine tridymite crystals matted together.

2. Silica brick according to claim 1, characterized by the fact that the wedges between the quartz grain structures with a tridymite layer are filled at least partially with matted fine crystalline tridymite formed from a silica sol or silic gel.

3. Silica brick according to claim 1 or 2, characterized by the fact that the pores, are filled with a silica sol.

4. Silica brick with quartz grain structures that are present in the matrix and have been converted to cristobalite and/or tridymite, characterized by the fact that the pores of the brick, are filled at least partially but preferably completely with a silica sol or silica gel.

5. Silica brick with quartz grain structures that are present in the matrix and have been converted to cristobalite and/or tridymite, characterized by the fact that the pores, are filled with a dried silica sol.

6. Silica brick according to claims 1 or 5, characterized by an increased tridymite content formed from 2.5 to 10 wt% silica sol and/or silica gel.

7. Silica brick according to claim 6, characterized by silicon carbide granules that are present in the matrix.

8. Silica brick according to claim 7, characterized by the fact that the silicon carbide granule content is 5 to 25 wt%.

9. Silica brick according to claim 7, characterized by the fact that the silicon carbide grains have a protective layer of tridymite crystals matted together.

10. Process for producing a silica brick, especially a silica brick with quartz grain structures present in the matrix and converted to cristobalite or tridymite or both, using conventional batch components containing lime, characterized by adding a silica sol or a silica gel to the batch, so that the quartz grain structures of the resulting silica brick are surrounded by a thin layer of tridymite formed by silica gel or silica sol and consisting of fine tridymite crystals melted together.

11. Process according to claim 10, characterized by the fact that silica sol or silica gel is added in an amount of 1.0 to 3.0 wt% $SiO_2$.

12. Process according to claim 10 and/or 11, characterized by the fact that the silica brick is impregnated with a silica sol after firing.

13. Process according to claim 12, characterized by the fact that the silica brick is fired again after impregnating until tridymite is formed from the silica sol.

14. Process for producing a silica brick from the conventional batch of raw materials containing lime, characterized by the fact that the fired brick is impregnated with a silica sol.

15. Process according to claim 14, characterized by the fact that the silica brick is fired after impregnating until tridymite is formed from the silica sol.

16. Process according to claim 15, characterized by the fact that an anionic silica sol silica gel is used.

17. Process according to claim 15, wherein the impregnation is performed under the influence of pressure greater than atmospheric pressure.

18. Process according to claim 15, wherein the impregnation is performed under the influence of a pressure less than atmospheric pressure.

19. Process according to claim 18, characterized by the fact that silicon carbide granules are added to the batch of raw materials.

20. Process according to claim 19, characterized by the fact that silicon carbide granules with grain sizes between 0.1 and 1.0 mm, are added.

21. Process according to claim 19, characterized by the fact that silicon carbide is added in the amount of 5 to 25 wt%, preferably 10 to 20 wt%.

* * * * *

UNITED STATES PATENT AND TRADEMARK OFFICE
CERTIFICATE OF CORRECTION

PATENT NO. : 4,866,015

DATED : September 12, 1989

INVENTOR(S) : Hans-Joachim Koschlig, et al

It is certified that error appears in the above-identified patent and that said Letters Patent is hereby corrected as shown below:

Col. 9, claim 3, line 2, cancel the comma (,) immediately after "pores".

Col. 9, claim 4, line 5, cancel the comma (,) immediately after "brick".

Col. 9, claim 4, lines 5 and 6, cancel "but preferably completely".

Col. 9, claim 5, line 4, cancel the comma (,) immediately after "pores".

Col. 9, claim 10, lines 1 and 2, cancel ", especially a silica brick".

Col. 10, claim 20, line 3, cancel the comma (,) immediately after "mm".

Signed and Sealed this

Eighteenth Day of June, 1991

*Attest:*

HARRY F. MANBECK, JR.

*Attesting Officer*  Commissioner of Patents and Trademarks